United States Patent Office 3,109,019
Patented Oct. 29, 1963

3,109,019
PROCESS FOR PREPARING A WATER-SOLUBLE SODIUM SALT OF ACETYLSALICYLIC ACID
Peter Schlösser, Brabeckstrasse 16, Letmathe, Westphalia, Germany
No Drawing. Filed June 16, 1959, Ser. No. 820,603
6 Claims. (Cl. 260—480)

This invention relates to the preparation of water-soluble salts from acetylsalicylic acid and it has particular relation to the preparation of water-soluble salts of the acetylsalicylic acid with sodium.

Since about 60 years the acetylsalicylic acid has been used as an important chemotherapeutically active agent on a large scale, particularly as a valuable analgesic agent and in the treatment of rheumatic disorders. Due to its low solubility in water, it has been administered in the form of solid tablets per os, in numerous cases in combination with other medicaments.

Many attempts have been made to react the acetylsalicylic acid with salt-forming ingredients in the presence of organic solvents in order to convert it into easily water-soluble salts and it also has been suggested to mix the acetylsalicylic acid in the absence of water with oxides, hydroxides or carbonates of metals in order to form products to be mixed with water just before therapeutic administration. The normal way of forming salts in aqueous medium could not be used in the case of acetylsalicylic acid in view of the decomposition of the acetyl salicylic acid by saponification in aqueous medium.

It has now been unexpectedly found that water-soluble salts of acetylsalicylic acid which are practically free from saponification products, such as salicylic acid and acetic acid, can be formed by proceeding in the following manner.

Acetylsalicylic acid is reacted with $NaHCO_3$ or $Na_2CO_3$ or their mixtures in solid condition, in the presence of a limited, small amount of water which is sufficient for moistening the beforementioned reaction components and the salt-forming reaction is conducted by mild heating of the reaction mass, whereby the water formed in the reaction keeps the reaction going with the formation of a solid reaction product. This reaction product is cautiously dried, if desired after subjecting the reaction product to pressing or centrifuging prior to drying.

The sodium salts of acetylsalicylic acid are easily soluble in cold or warm water, of, for example, 10°–40° C. The salts prepared according to this invention are practically stable in dry condition.

The following examples illustrate some specific embodiments of and best modes for carrying out the invention to which the invention is not limited.

Example 1

180 grams of acetylsalicylic acid are uniformly moistened with about 25 grams of water and mixed during about 10–15 minutes with about 100 grams of $NaHCO_3$. The formation of the sodium salt starts at ordinary room temperature, e.g. 15°–20° C., with the evolution of gaseous $CO_2$ and lowering of temperature. The reaction mass is heated up to about 30° C., whereby the mass first becomes temporarily liquid and then solidifies with the formation of crystals. Completion of the reaction is indicated when a sample of the mass dissolves in water without substantial evolution of $CO_2$. This completion takes about 60 to 90 minutes. The reaction mass is allowed to cool, is disintegrated and then dried, if desired after pressing or centrifuging. The drying temperature should not exceed 50°–52° C. The salt obtained has a pleasant acidulous taste in solid condition. It is easily and quickly soluble in water to a tasteless clear solution.

Example 2

180 grams of acetylsalicylic acid,
25 grams of water, and
168 grams of $NaHCO_3$ are treated in the manner described in the above Example 1, whereby 286 grams of solid product consisting of 1 mol of acetylsalicylic acid sodium salt and 1 mol of $NaHCO_3$ are obtained.

Example 3

In carrying out the above Example 1 or 2, the acetylsalicylic acid and the $NaHCO_3$ are mixed in the absence of water, which is then added to the mixture in the amount stated in the above Example 1 or 2.

The mixture of acetylsalicylic acid, $NaHCO_3$ and water is then further treated in the manner described in the above Example 1.

Example 4

The ingredients described in the above Examples 1 and 2 are mixed and stirred in dry condition and warmed on a water bath to about 35° C. To this mixture 15–20 grams—preferably 18 grams—water of 35° C. are at once added. After the temperature falls to about 25° C., the mixture is kept at about 30° C. until a small sample dissolves in water easily and substantially without the evolution of $CO_2$ in cold water. The resulting mass is dried and is then free from salicylic acid.

Example 5

In the above examples the sodium bicarbonate is partly or entirely substituted by an equivalent amount of sodium carbonate and the process is carried out in the manner described in any of the preceding examples.

What is claimed is:

1. A process for preparing a water-soluble sodium salt of acetylsalicylic acid, comprising reacting in the range between ordinary room temperature and 35° C., acetylsalicylic acid and a basic compound in solid condition selected from the group consisting of $NaHCO_3$ and $Na_2CO_3$, in the presence of, as the sole added liquid, a limited amount of water which is sufficient only for moistening the reactants, and drying the reaction product at a temperature not exceeding 50° C.

2. A process as claimed in claim 1, in which water is mechanically removed from the reaction mass, prior to drying.

3. A process as claimed in claim 1, in which the reactants are used in about stoichiometric proportions.

4. A process as claimed in claim 1, in which the basic compound is sodium bicarbonate.

5. A process as claimed in claim 4, in which the sodium bicarbonate is used in an excess of the one mol.

6. A process as claimed in claim 1, in which a mixture of $NaHCO_3$ and $Na_2CO_3$ is used as the basic compound.

References Cited in the file of this patent
UNITED STATES PATENTS

| | | |
|---|---|---|
| 1,113,742 | Berendes et al. | Oct. 13, 1914 |
| 1,129,953 | Busch | Mar. 2, 1915 |
| 1,217,862 | Gerngross | Feb. 27, 1917 |
| 1,225,407 | Bush et al. | May 8, 1917 |
| 1,486,373 | Gerngross et al. | Mar. 11, 1924 |
| 2,003,374 | Lawrence | June 9, 1935 |

UNITED STATES PATENT OFFICE
CERTIFICATE OF CORRECTION

October 29, 1963

Patent No. 3,109,019

Peter Schlösser

It is hereby certified that error appears in the above numbered patent requiring correction and that the said Letters Patent should read as corrected below.

Column 2, line 57, strike out "the".

Signed and sealed this 21st day of April 1964.

(SEAL)
Attest:

ERNEST W. SWIDER
Attesting Officer

EDWARD J. BRENNER

Commissioner of Patents